United States Patent [19]

Van Leeuwen

[11] Patent Number: 5,608,834
[45] Date of Patent: Mar. 4, 1997

[54] LIQUID LIGHT GUIDE

[75] Inventor: Timothy O. Van Leeuwen, Brookfield, Conn.

[73] Assignee: United States Surgical Corporation, Norwalk, Conn.

[21] Appl. No.: 319,698

[22] Filed: Oct. 7, 1994

[51] Int. Cl.$^6$ ................................................ G02B 6/20
[52] U.S. Cl. ................................................ 385/125
[58] Field of Search ................................ 385/142, 143, 385/123, 125, 901, 147

[56] References Cited

U.S. PATENT DOCUMENTS

| | | | |
|---|---|---|---|
| 3,089,484 | 5/1963 | Hett | 385/117 |
| 3,641,332 | 2/1972 | Reick et al. | 383/142 |
| 3,740,113 | 6/1973 | Cass | 385/125 |
| 3,770,350 | 11/1973 | Stone et al. | 385/125 |
| 3,814,497 | 6/1974 | Stone | 385/125 |
| 3,920,980 | 11/1975 | Nath | 385/125 |
| 3,995,934 | 12/1976 | Nath | 385/125 |
| 4,009,382 | 2/1977 | Nath | 385/125 |
| 4,045,119 | 8/1977 | Eastgate | 385/125 |
| 4,286,839 | 9/1981 | Ilzig et al. | 385/125 |
| 4,465,621 | 8/1984 | Sacher | 252/582 |
| 4,471,474 | 9/1984 | Fields | 385/15 |
| 4,491,533 | 1/1985 | Sacher et al. | 252/301 |
| 4,526,711 | 7/1985 | Sacher et al. | 252/582 |
| 4,697,870 | 10/1987 | Richards | 385/125 |
| 4,747,662 | 5/1988 | Fitz | 385/125 |
| 4,801,187 | 1/1989 | Elbert et al. | 385/125 |
| 4,805,598 | 2/1989 | Ueda | 359/665 |
| 4,901,922 | 2/1990 | Kessener et al. | 362/32 |
| 4,907,133 | 3/1990 | Nath | 362/32 |
| 4,927,231 | 5/1990 | Levatter | 385/125 |
| 4,957,347 | 9/1990 | Zarion | 385/125 |
| 5,052,778 | 10/1991 | Jamshid | 385/123 |
| 5,067,831 | 11/1991 | Robbins et al. | 385/123 |
| 5,122,580 | 6/1992 | Zarion et al. | 385/141 |
| 5,143,435 | 9/1992 | Kikuchi | 362/32 |
| 5,149,467 | 9/1992 | Zarion | 385/125 |
| 5,165,773 | 11/1992 | Nath | 385/125 |
| 5,221,387 | 6/1993 | Robbins et al. | 385/125 |
| 5,257,329 | 10/1993 | Blyer, Jr. et al. | 385/125 |
| 5,267,341 | 11/1993 | Shearin | 385/125 |
| 5,333,227 | 7/1994 | Ishiharada et al. | 385/900 |
| 5,351,319 | 9/1994 | Ginder et al. | 385/125 |

FOREIGN PATENT DOCUMENTS

| | | |
|---|---|---|
| 48867 | 5/1974 | Australia . |
| 0105706 | 8/1987 | European Pat. Off. . |
| 2352670 | 10/1973 | Germany . |
| 2406424 | 2/1974 | Germany . |
| 2424620 | 5/1974 | Germany . |
| 2429859 | 6/1974 | Germany . |
| 2433218 | 7/1974 | Germany . |
| 2719504 | 5/1977 | Germany . |
| 3523243 | 6/1985 | Germany . |
| 3529488 | 8/1985 | Germany . |
| 3626629 | 8/1986 | Germany . |

(List continued on next page.)

OTHER PUBLICATIONS

Liquid Optical Fibers, G. W. Taylor, vol. 11, No. 4, Apr. 1972 (pp. 786–790).
English Language Abstract for German Publication No. 4014363, 1990.

Primary Examiner—John Ngo

[57] ABSTRACT

A liquid light guide for surgical instrumentation, includes a flexible elongated tube having opposed tube portions, a transmissive member positioned within each tube end portion of the elongated tube to enclose an interior portion of the elongated tube and a light transmissive medium filling the interior portion of the elongated tube. A sealing mechanism forms a fluid tight seal between each tube end portion and the light transmissive plug to prevent leakage of the fluid from the tube. The liquid light guide is capable of providing excellent light transmission over the entire visible spectral range while substantially reducing undesired transmission of infrared and ultraviolet radiation. The light guide is contemplated to be used with an endoscope and is cost-effective to manufacture. Methods of making and using the disposable light guide also are disclosed.

20 Claims, 9 Drawing Sheets

FOREIGN PATENT DOCUMENTS

| | | |
|---|---|---|
| 3634651 | 10/1986 | Germany . |
| 3644839 | 12/1986 | Germany . |
| 3704871 | 2/1987 | Germany . |
| 3704872 | 2/1987 | Germany . |
| 3812473 | 4/1988 | Germany . |
| 613284 | 4/1977 | Switzerland . |
| 1450608 | 9/1976 | United Kingdom . |
| 1502445 | 3/1978 | United Kingdom . |
| 2248312 | 4/1992 | United Kingdom . |

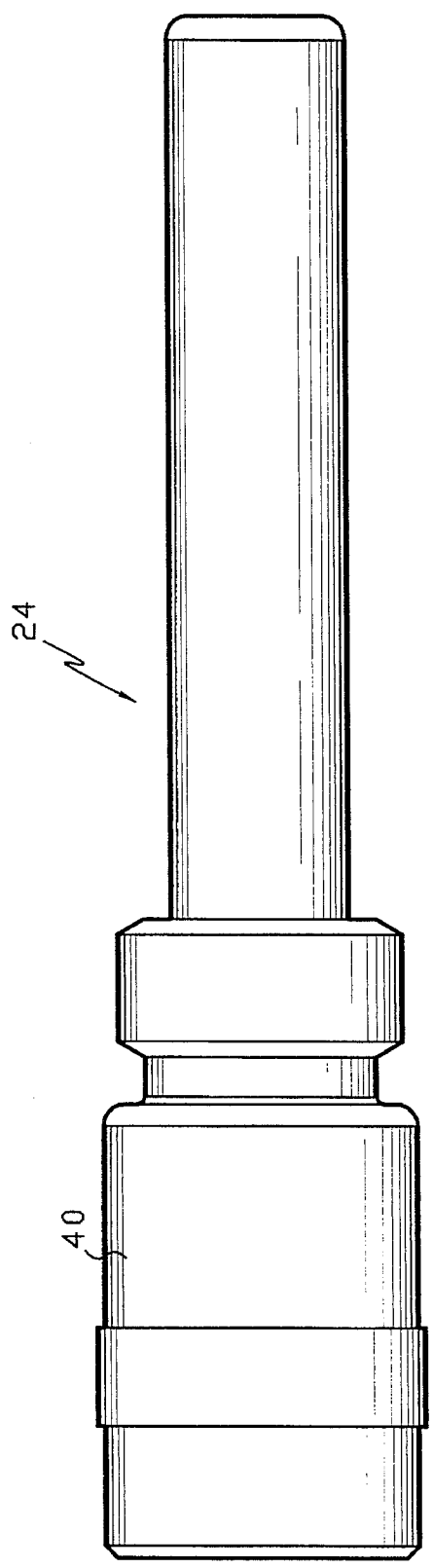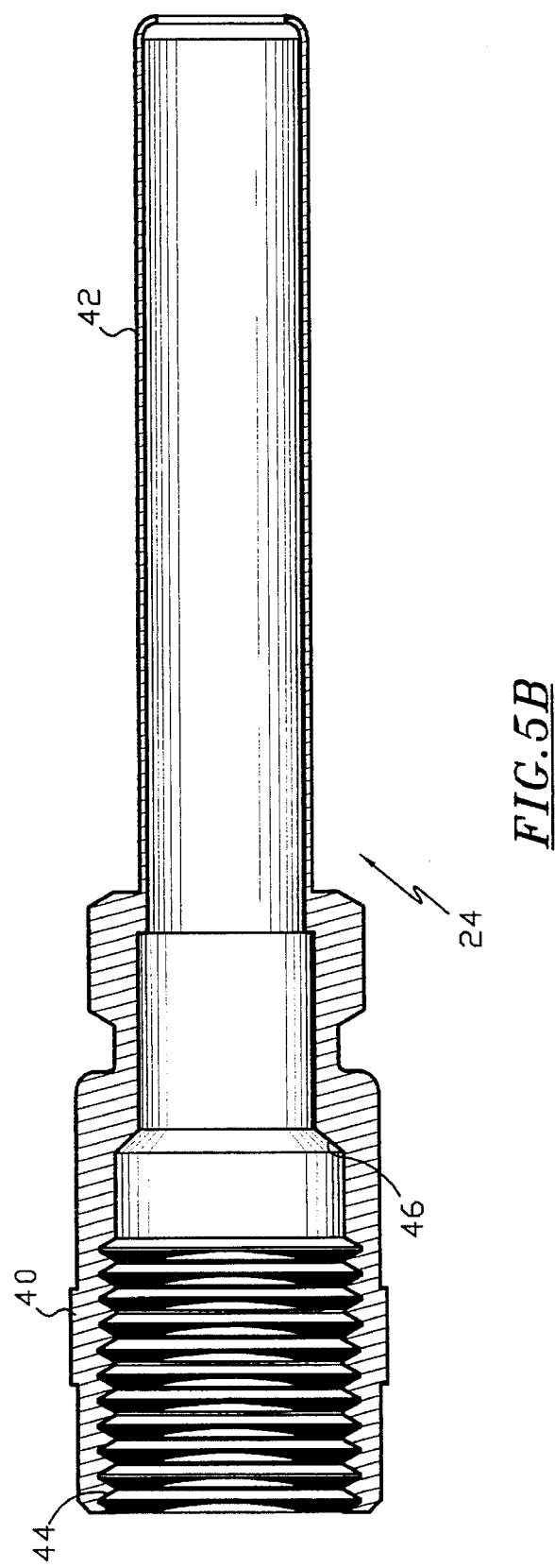
FIG.5A
FIG.5B

LIQUID LIGHT GUIDE

BACKGROUND

1. Technical Field

The present disclosure relates generally to light guides for transferring illuminating light from a light source to surgical instrumentation, and, more particularly, to a flexible liquid light guide for transmitting light in the visible spectral range to an endoscope.

2. Background of Related Art

In endoscopic surgical procedures, illuminating light is typically transmitted from an external light source to an endoscope where the light is then transmitted via an illuminating system incorporated within the endoscope to the body cavity to be viewed. A conventional light cable for providing the endoscope with illumination is a fiber optic light bundle having a plurality of optical fibers of glass or optical plastic. The fiber optic bundle is connected at one end to the light source and at the other end to an inlet port of the endoscope. This system is typically referred to as a fiber optic light guide.

A significant drawback of fiber optic light guides involves the degradation of the fibers when used over extended periods of time. This degradation is due in part to the repetitive flexing the light guide experiences when the bundle is initially connected to the light source and the endoscope, and during maneuvering about the operative site in the course of the surgical procedure. Since fiber optic light guides are relatively expensive and are intended to be reused, the light guides are typically employed in many surgical procedures over a substantial period of time. Consequently, the light transferring quality of the fiber optic light guide tends to gradually degrade to a point where the level of light emitted by the fiber optic bundle is substantially less than the light initially received from the light source.

One attempted solution to this problem has been to substitute liquids for fiber optic bundles. Examples of such liquid light guides are described in U.S. Pat. Nos. 3,740,113; 3,920,980; 3,995,934; 4,045,119; 4,907,133 and 5,165,773. In the light guides suggested in these patents, a liquid transmissive fluid is encapsulated within a flexible tube which is closed off at each end with a transparent end plug. Light entering the guide is transmitted via the fluid to the endoscope. Conventional liquid transmissive fluids include nitrobenzene, camphor oil, linseed oil, chlorobenzene, castor oil and benzyl alcohol.

Conventional liquid light guides such as those described in the above-mentioned patents have their own drawbacks and limitations. In particular, these light guides are subject to leakage particularly through the seals created between the end plugs and the end portions of the flexible tube. This is particularly true at the light source entry side of the light guide where the heat generated by the light source affects the integrity of the seal, e.g., may degrade the adhesive seals attaching the end plug to the flexible tube. The heat may also degrade the liquid light transmissive material and introduce optical defects such as bubble therein. Another disadvantage with known liquid light guides include their relative expense.

Accordingly, the present disclosure is directed to a low cost liquid light guide capable of efficiently supplying an endoscope with illuminating light particularly in the visible spectral range and one which incorporates structure which positively seals the end portions of the light guide cable to prevent leakage of the light transmissive fluid contained therein. Manufacture and assembly of the light guide is relatively inexpensive in comparison to fiber type cables.

SUMMARY

The present disclosure is directed to a liquid light guide for surgical instrumentation. The light guide includes a flexible elongated tube having opposed tube end portions, a transmissive member positioned within each tube end portion to enclose an interior portion of the elongated tube and a light transmissive fluid filling the interior portion of the elongated tube. A sealing assembly forms a fluid tight seal between each tube end portion and the light transmissive plug to prevent leakage of the liquid from the tube. The sealing assembly includes a compressible seal ring which in operative association with compression members compresses the seal ring to seal the tube end portion about the transmissive plug.

The liquid light guide of the present disclosure is capable of providing excellent light transmission over the entire visible spectral range while substantially reducing undesired transmission of infrared and ultraviolet radiation. The light guide is contemplated to be used with an endoscope and is cost-effective to manufacture. Methods of making and using the disposable light guide are also disclosed.

BRIEF DESCRIPTION OF THE DRAWINGS

Preferred embodiments of the present disclosure are described hereinbelow with reference to the drawings wherein:

FIG. 5A is an enlarged side plan view of a second compression member in the form of a light source cap;

FIG. 5B is an enlarged cross-sectional view of the light source cap of FIG. 5A;

DETAILED DESCRIPTION OF PREFERRED EMBODIMENT(S)

Figure 1:
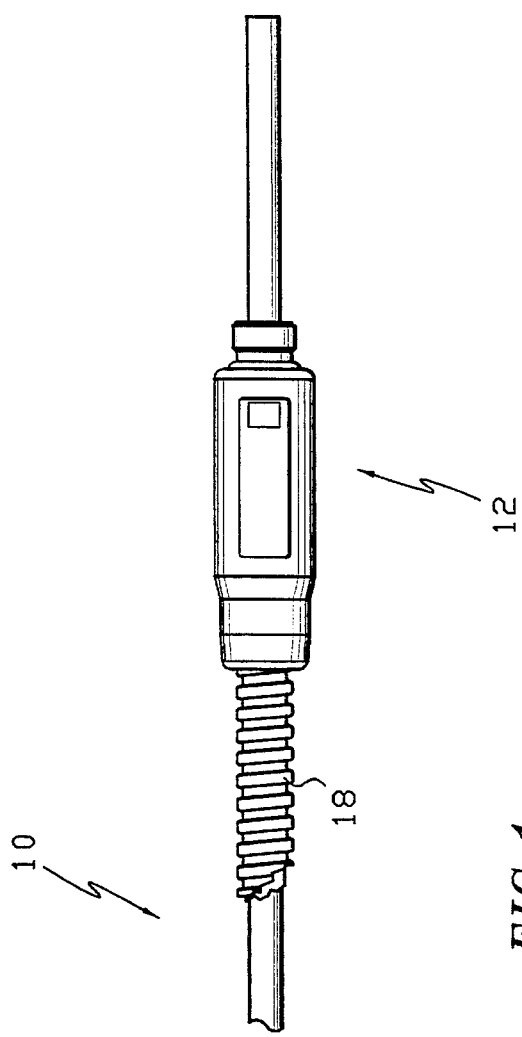
FIG. 1 is a side plan view with portions cut away of the liquid light guide constructed in accordance with the principles of the present disclosure.
Figure 1:
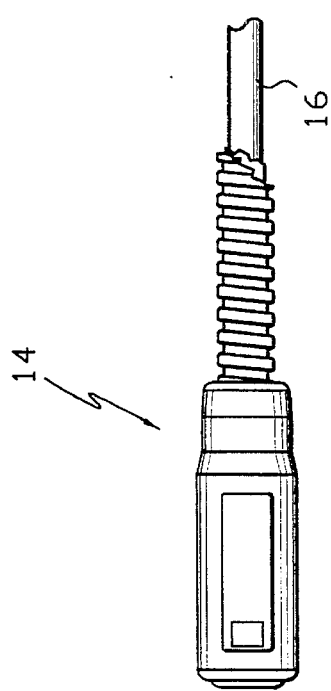

Referring now to the drawings in detail in which like reference numerals identify similar or identical elements throughout the several views, FIG. 1 illustrates a preferred embodiment of the liquid light guide. Light guide 10 is intended to connect at its light entry end portion 12 to a conventional light generating apparatus (not shown) and at its light exit end portion 14 to an endoscope (not shown), thereby transmitting illuminating light generated by the light generating apparatus to an illumination system of an endoscope.

Light guide 10 includes elongated tube 16 which may be fabricated from a suitable polymeric material such as polytetrafluoro-ethylenehexafluoropropylene, perfluoralkoxy resin (PFA), a copolymer of tetrafluoroethylene and hexafluoropropylene, polytetrafluoroethylene (PTFE) or the like. In the preferred embodiment, elongated tube 16 is fabricated from a fluorinated ethylene polymer (FEP). FEP provides a desired numerical aperture by controlling the refractive index difference between the liner and the transmissive fluid. A corrugated metal tubing or outer sheath 18 (shown partially cut away) is positioned about elongated tube 16. Metal outer sheath 18 extends the length of elongated tube 16 and provides support to the tube during manipulation about the surgical site. Metal outer sheath 18 also assists in mounting the light and endoscope connectors as will be discussed in greater detail below.

Elongated tube 16 is filled with a light transmitting medium or fluid. Suitable light transmissive fluids for this purpose include aqueous salt solutions or multivalent alcohols such as glycerine or thylene alcohol, phenyl-methyl silicone oil, castor oil or the like. One preferred fluid having optical characteristics particularly suited for light transmission is a pharmaceutical grade heavy mineral oil having a specific gravity equal to or greater than about 0.84 and, preferably, greater than about 0.86. The specific benefits of this mineral oil and its use in liquid light guide optics are set forth in commonly assigned U.S. patent application Ser. No. 08/134,365, filed Oct. 8, 1993, the contents of which are incorporated herein by reference. Such mineral oils are capable of providing very high light transmission over the visible spectral range while reducing transmission of infrared and ultraviolet radiation. This feature is particularly useful in minimizing undesirable heat transfer from the light generating apparatus to the endoscope. It is also contemplated that an outer sheath fabricated from a polymeric material such as polyethylene, polyvinylchloride (PVC), nylon, polyurethane or silicone may be provided around elongated tube 16, as described in the foregoing application.

Figure 2:
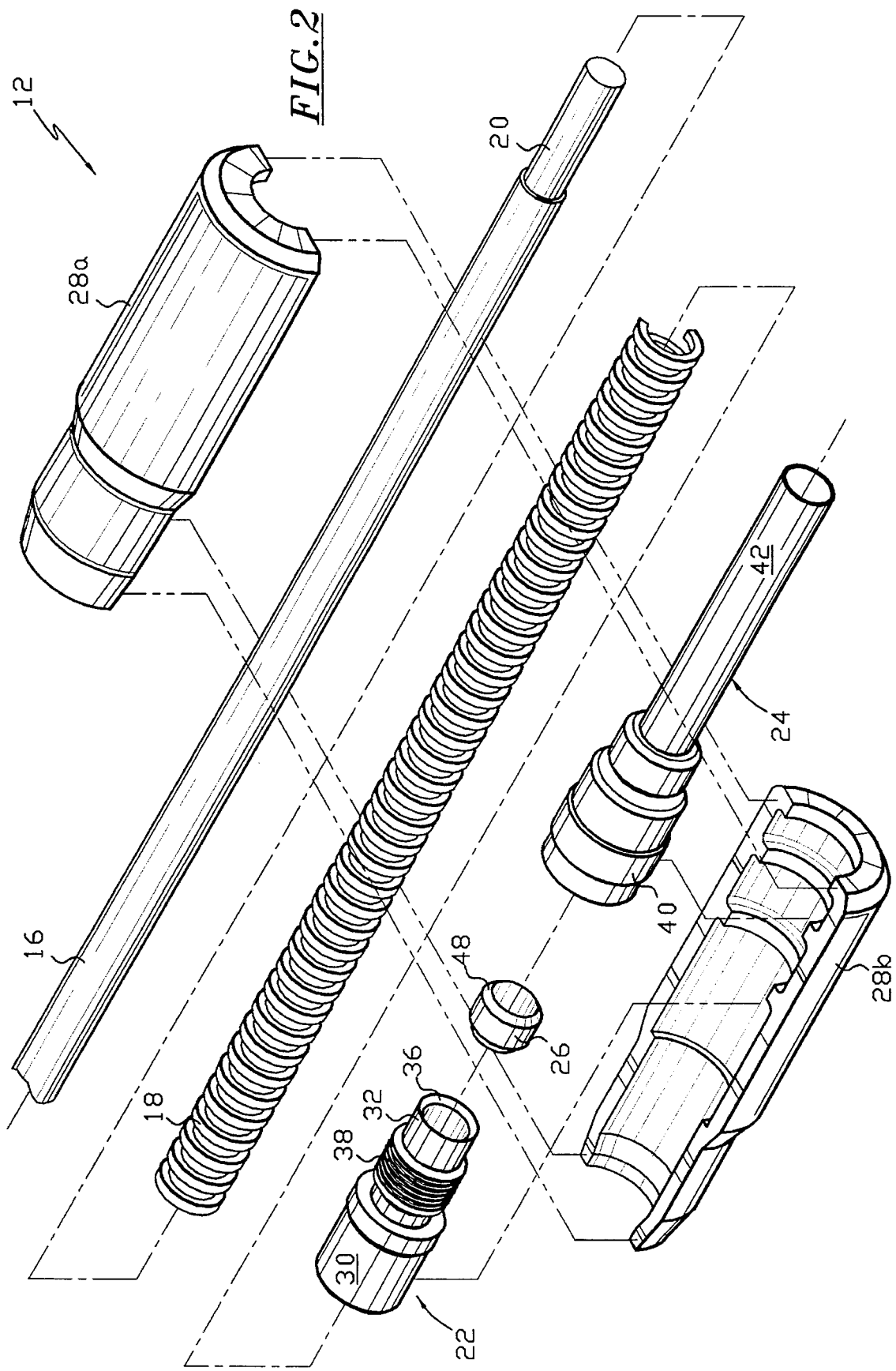
FIG. 2 is a perspective view with parts separated of the light entry end portion of the liquid light guide of FIG. 1.
Figure 3:
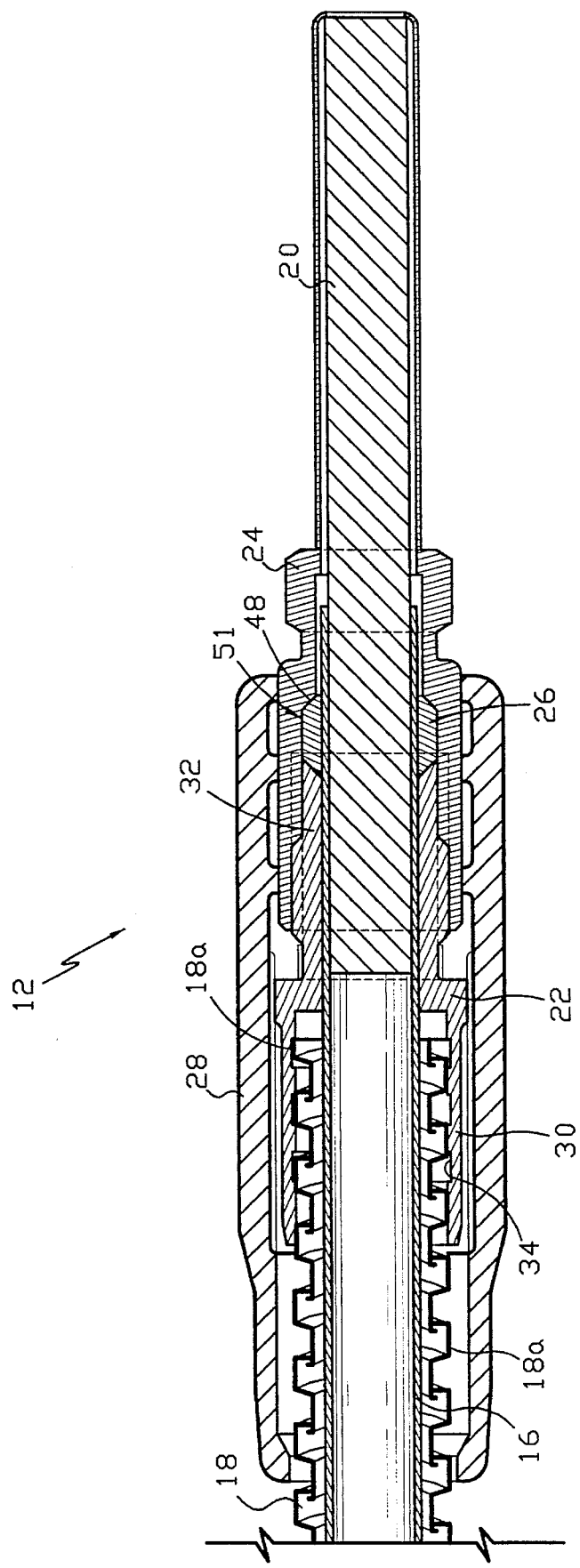
FIG. 3 is an enlarged cross-sectional view of the light entry end portion of the light guide.

Referring now to FIGS. 2 and 3, there is illustrated the light entry end portion 12 of light guide 10 in detail. Light entry end portion 12 includes a light transmissive end plug 20, a first compression member in the form of locking nut 22, a second compression member in the form of light source cap 24 and seal ring 26. Light entry end portion 12 also includes an outer shell 28 having first and second half sections 28a, 28b, which encloses the components of the light entry end portion.

Light transmissive end plug 20 of light entry end portion 12 is positioned within elongated tube 16 to seal the tube end portion. End plug 20 is a generally cylindrically shaped glass rod preferably fabricated from a material having an index of refraction similar to that of the light transmissive medium. In a preferred embodiment, end plug 20 is fabricated from optical glass having an index of refraction of about 1.48 to closely match the index of refraction of the light preferred transmissive mineral oil. Suitable glass materials for end plug 20 include quartz, quartz glass, Pyrex™, or any other material transparent to radiation. It is contemplated that inexpensive plastic plugs, such as polycarbonate plugs, may be used, but glass is preferred for its resistance to heat. The end faces of transmissive plug 20 are polished and, if desired, may be coated with an anti-reflection coating. Further, a shrinkable tubing can be positioned over portions of the end plug not inserted within elongated tube 16. The shrinkable tubing preferably has the same index of refraction as elongated tube 16 and serves to prevent loss of light through the outer surfaces of the end plug.

In the most preferred embodiment, end plug 20 is a glass rod formed by heat drawing techniques. Such heat drawn glass rods are considerably less expensive to manufacture than non-drawn glass rods and do not require the polishing of their peripheral surfaces to maintain optical effectiveness. The end faces of such heat drawn glass rods are polished and may be coated with a suitable anti-reflection coating. Advantageously, transmissive end plug 20 also functions in filtering out light in the ultraviolet range to thereby protect light transmissive medium from the damaging effect of the ultraviolet radiation. Accordingly, ultraviolet radiation emitted by the light generating apparatus is filtered by end plug 20 prior to entrance into the light transmissive medium. In this regard, the end face of plug 20 at the light source further may be provided with a filter, such as an ultra-violet filter, to further reduce heat transmission from the light source to the cable. The filter could be coated onto the end face or could be provided as a window inserted into the light source cap 24 in front of the plug, or adhered to the front surface of the plug. The filter also could be adhered to the surface of the plug away from the light source, but such a configuration would reduce the effectiveness of the filter in the system. Transmissive plug 20 preferably defines an outer diameter which is approximately equal to the inner diameter of elongated tube 16.

Figure 4A:
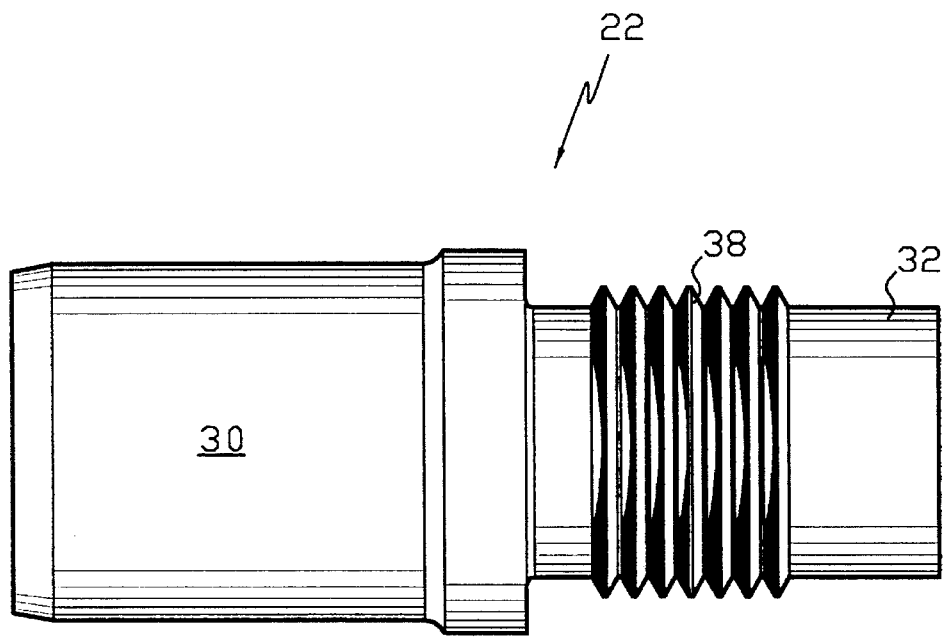
FIG. 4A is an enlarged side plan view of a compression member in the form of a locking nut for securing the light source connector and endoscope cap to the flexible tube of the light guide.
Figure 4B:
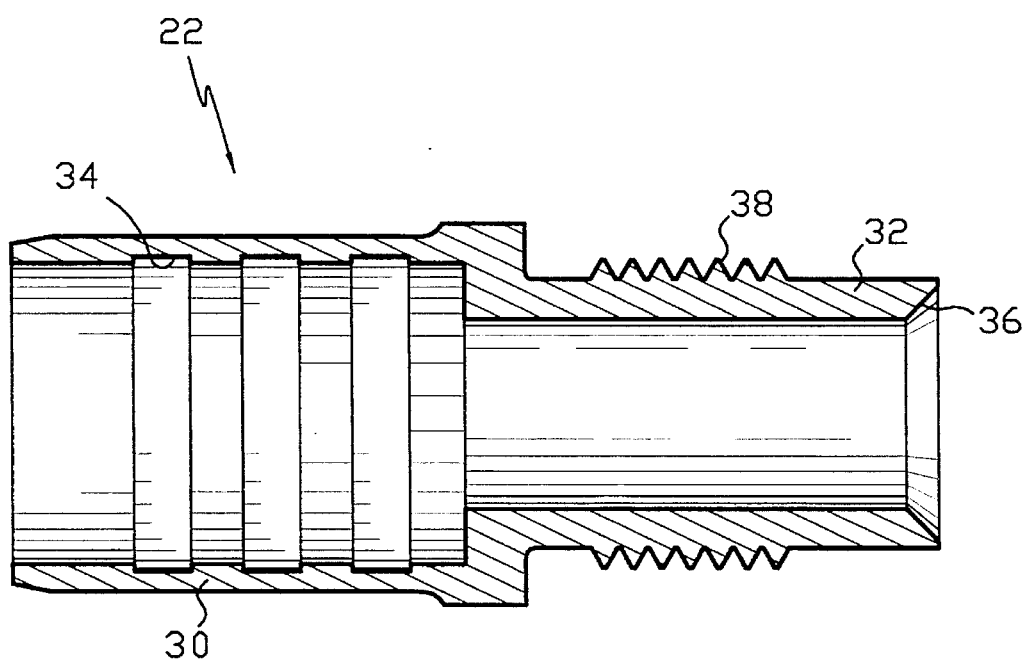
FIG. 4B is an enlarged cross-sectional view of the compression member of FIG. 4A.

Referring now to FIGS. 4A–4B, in conjunction with FIGS. 2 and 3, locking nut 22 of light entry end portion 12 will be discussed in detail. Locking nut 22 is generally cylindrically shaped and possesses a first end portion 30 which receives metal outer sheath 18 and a second end portion 32 which is positioned within light source cap 24. First end portion 30 of locking nut 22 is secured to the outer surface of metal outer sheath 18 by conventional means such as with the use of adhesives, cements, spot welding or the like. In the preferred embodiment, locking nut 22 is secured to the metal outer sheath 18 with a potting compound. First end portion 30 includes a plurality of internal grooves 34. Each groove 34 accommodates a ridge 18a defined by the corrugated metal sheath 18 to assist in mounting the locking nut 22 to the sheath. Locking nut 22 includes an internal chamfered end surface 36 and an external threaded portion 38, the significance of which will be discussed in detail below.

Referring now to FIGS. 5A–5B, in conjunction with FIGS. 2 and 3, light source cap 24 includes first end portion 40 which defines an axial bore for receiving locking nut 22 and second elongated end portion 42. First end portion 40 of light source cap 24 includes an internal threaded portion 44 which threadably engages external threaded portion 38 of locking nut 22 to secure the two components. Second end portion 42 of light source cap 24 accommodates transmissive plug 20. Light source cap 24 further defines an internal chamfered surface portion 46.

Referring again to FIGS. 2 and 3, seal ring 26 is generally annular in configuration and defines opposed outer chamfered surface portions 48. Each chamfered surface portion 48 is engaged by respective internal chamfered surfaces 36, 46 of locking nut 22 (FIG. 4B) and light source cap 24 (FIG. 5B), respectively. The chamfered surface portions 48 of seal ring 26 are angularly offset at substantially the same angle as the respective chamfered surfaces 36, 46 of locking nut 22 and light source cap 24 to ensure proper mating of these components and inward deformation of the seal ring during assembly as will be appreciated from the description provided below. Seal ring 26 is fabricated from a suitable material which permits deformation of the ring upon application of a force. Suitable materials for this purpose includes soft metals such as aluminum or the like and resilient polymeric materials. In a preferred embodiment, seal ring 26 is fabricated from neoprene.

Assembly of light inlet portion 12 of light guide 10 will now be discussed. With reference to FIGS. 2 and 3, end plug 20 is positioned substantially within elongated tube 16 with any portion of plug 20 extending beyond the end of the elongated tube preferably covered with a thin additional layer shrink tubing, (not shown), such as FEP shrink tubing, to act as a light boundary for the sides of the plug. Metal outer sheath 18 is positioned over elongated tube 16. Locking nut 22 is then placed over end plug 22 and advanced until outer sheath 18 is received within first end portion 30 of the locking nut 22. First end portion 30 of locking nut 22 is secured to outer sheath 18 upon curing of the potting compound or adhesive which is applied prior to the positioning of the locking nut 22 over the outer sheath 18. Assembly is continued by placing seal ring 26 over end plug 20 and elongated tube 16, and positioning the seal ring 26 adjacent chamfered surface portion 36 of locking nut 22. Light source cap 24 is slid over end plug 20 such that the internal threaded portion 44 of the light source cap 24 (FIG. 5b) threadably engages the external threaded portion 38 of locking nut 22. In the mounted condition of light source cap 24 on locking nut 22, a compression cavity, identified generally as reference numeral 51 (see FIG. 3), is defined within the boundaries of the respective chamfered surface portion 36 of locking nut 22 (see FIG. 4B) and chamfered surface portion 46 of light source cap 24 (see FIG. 5B) to accommodate seal ring 26. Tightening light source cap 24 onto locking nut 22 causes the seal ring 26 to be compressed within compression cavity 51, i.e., the engagement of the respective chamfered surfaces 36, 46 of the locking nut 22 and light source cap 24 with the chamfered surfaces 48 of the seal ring exerts a radial inward force onto the elongated tube 16. Consequently, a tight fluid seal is established between elongated tube 16 and end plug 20 to contain the transmissive fluid within the tube 16 during use. Thereafter, outer shell half sections 28a, 28b are positioned over the light source cap 24/locking nut 22 juncture and secured to each other to enclose the components and provide a convenient grip for the user. As illustrated in FIG. 2, the inner surface of each half section 28a, 28b includes a series of depressions or grooves which accommodate corresponding portions of locking nut 22 and light source cap 24 to form a snug fit over the components. Outer shell is preferably fabricated from a polymer material and formed by injection molding or the like. The two halves can snap together or may be glued, welded or the like.

Figure 6:
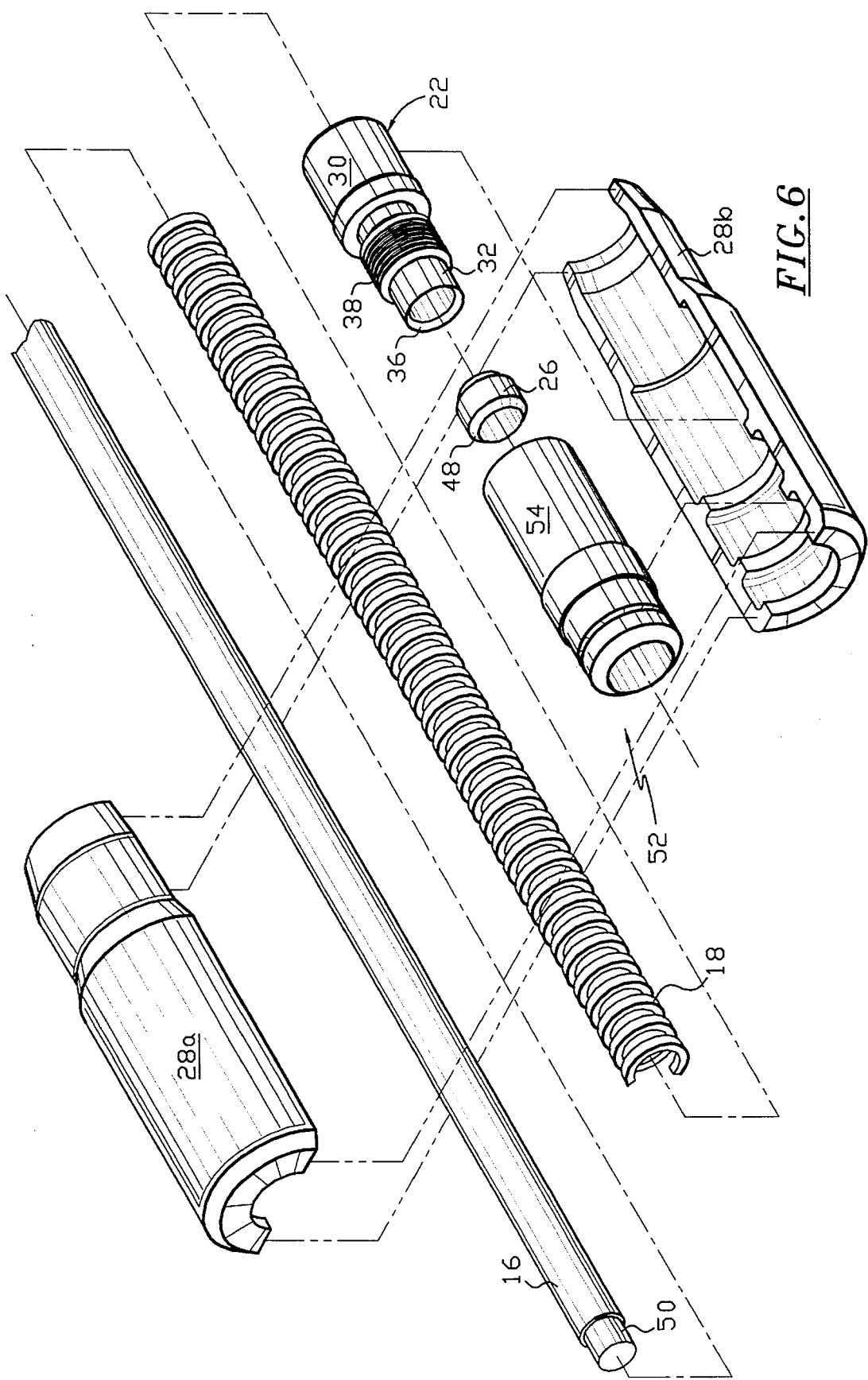
FIG. 6 is a perspective view with parts separated of the light exit end portion of the liquid light guide of FIG. 1.
Figure 7:
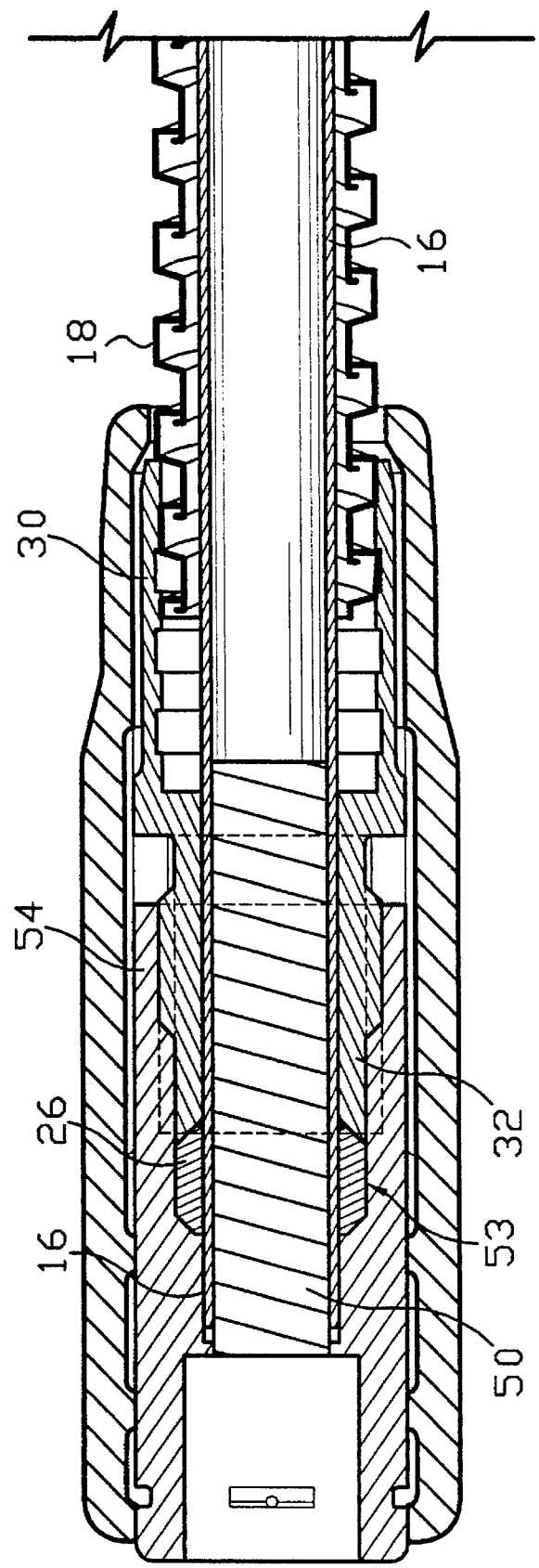
FIG. 7 is an enlarged cross-sectional view of the light exit end portion of the light guide.

Referring now to FIGS. 6–7, there is illustrated the light exit side 14 of light guide 10 in detail. Light exit side 14 includes transparent end plug 50, first compression member in the form of locking nut 22, seal ring 26 and a second compression member in the form of endoscope cap 52. Transparent end plug 50 is positioned within elongated tube 16 and is identical to end plug 20 of light entry end portion 12 except that end plug 50 is shorter in length. Similarly, locking nut 22 is identical to the locking nut 22 of light entry end portion 12 and is secured to outer sheath 18 in an identical manner to that described above. Likewise, seal ring 26 is identical in structure and function to the seal ring of light entry end portion 12.

Figure 8A:
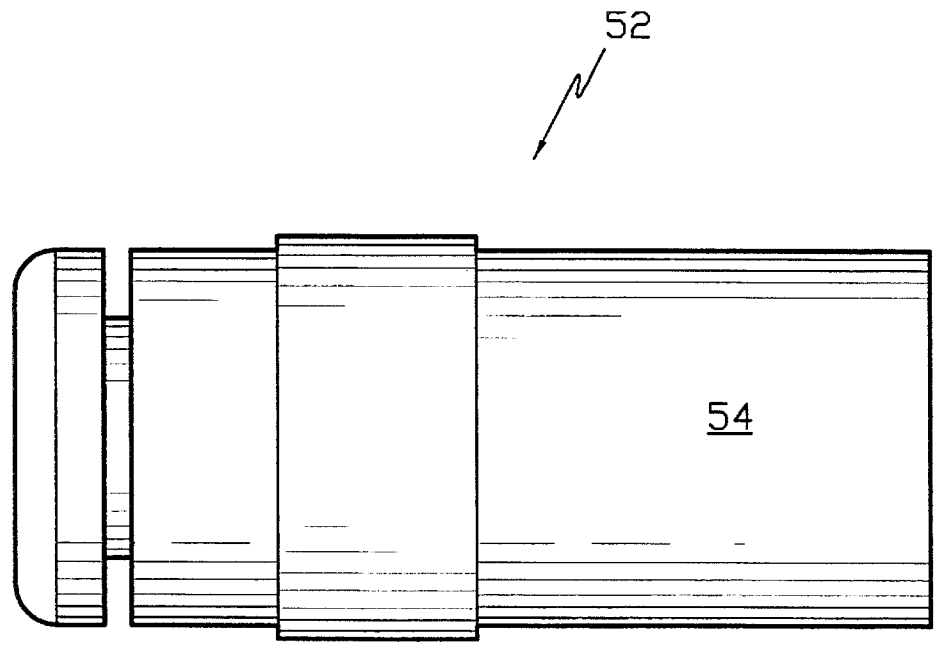
FIG. 8A is an enlarged side plan view of the endoscope cap incorporated within the light exit end portion of the light guide of FIG. 1.
Figure 8B:
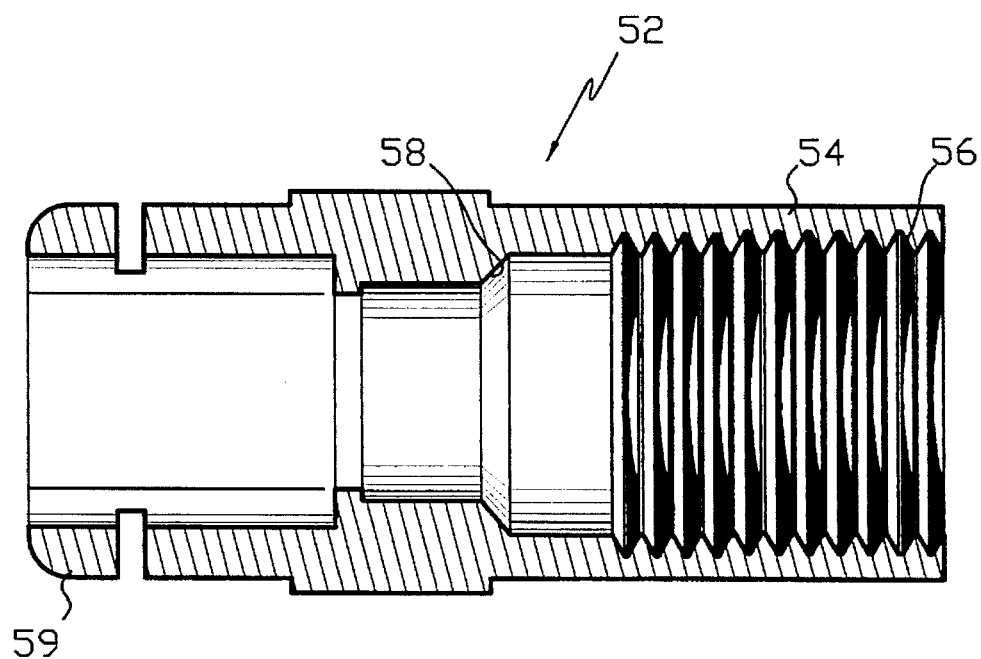
FIG. 8B is an enlarged cross-sectional view of the endoscope cap of FIG. 8A.

Referring to FIGS. 8A–8B, in conjunction with FIGS. 6–7, endoscope cap 52 includes a first end portion 54 defining a threaded region 56 which threadably engages threaded portion 38 of locking nut 22. Endoscope cap 52 also defines an internal chamfered surface 58 corresponding in dimension and orientation to the respective external chamfered surface 48 of seal ring 26. In assembly, end plug 50 is positioned within elongated tube 16 and locking nut 22 is secured to metal outer sheath 18 in a similar manner to that described above in connection with light entry end portion 12. Seal ring 26 is positioned over end plug 50 and advanced adjacent to chamfered surface 36 of locking nut 22. Thereafter, endoscope cap 54 is screwed onto locking nut with the threaded portion of the respective components threadably engaging each other to mount the locking cap to the nut. In the mounted condition of endoscope cap 52 on locking nut 22, a compression cavity, identified generally as reference numeral 53 (see FIG. 7), is defined within the boundaries of the respective chamfered surface portions 36, 38 of locking nut 22 and endoscope cap 52 to receive seal ring 26. Tightening of endoscope cap 52 onto locking nut 22 causes seal ring 26 to be compressed within the compression cavity 53 (via engagement of chamfered surface portions 36, 38 of locking nut 22 and endoscope cap 52 with the chamfered surfaces 48 of seal ring 26) thereby compressing elongated tube 16 and forming a fluid tight seal between the elongated tube 16 and end plug 50. Assembly is continued by mounting outer casing half sections 28a, 28b, which are identical to the outer half sections of light entry end portion 12, onto the components and securing the half sections to each.

Thus, through the provision of the sealing assembly of the present disclosure, i.e., seal ring 26, locking cap 22 and the light source and endoscope caps 24, 52, the light guide is positively sealed at its end portions to encapsulate the light transmissive fluid therein.

Figure 9:
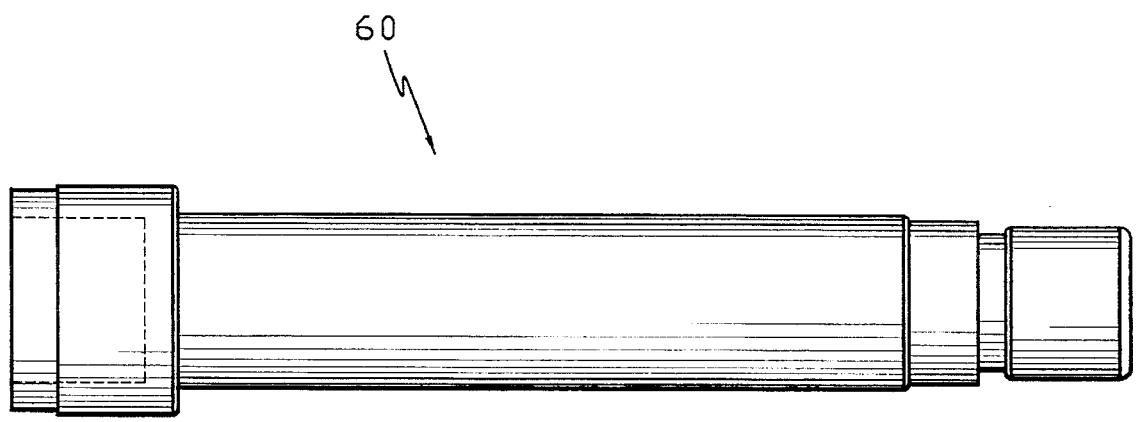
FIG. 9 is a side plan view of a conventional light source adapter which is positionable over the light source cap of FIGS. 5A–5B, to connect the light guide to an external light source.
Figure 10:
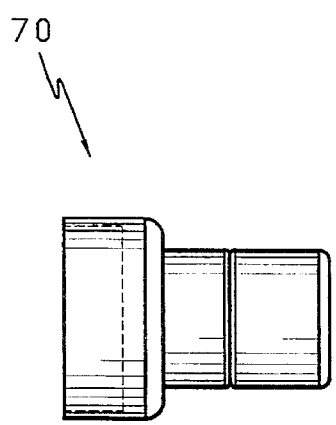
FIG. 10 is a side plan view of a conventional endoscope adapter which is positionable within the endoscope cap of FIGS. 8A–8B, to connect the light guide to a conventional endoscope.

In use, light source cap 24 and endoscope cap 52 may be directly connected to a light source apparatus and an endoscope respectively. In the alternative, it may be desirable to provide one or more adapters to make the light guide compatable with various commercial light sources and endoscopes. By way of example, a light source adapter 60 such as the adapter shown in FIG. 9 may be positioned onto second end portion 42 of light source cap 24 and then connected to a light source, such as a light source available from Richard Wolf, Inc. Similarly, an endoscope adapter 70 such as the adapter shown in FIG. 10 may be positioned within a bore of second end portion 59 (FIG. 8B) of endoscope cap 52 and mounted to the Richard Wolf endoscope. Various commercially available light sources and endoscopes for which adapters can be provided are manufactured by Luxtec, Pilling, Olympus and Karl Storz.

Various modifications to light guide 10 are also contemplated. By way of example, it is envisioned that a cover, in the form of a shrinkable tubing, may be placed over metal outer sheath 18 to encapsulate the sheath 18. Such a cover may be desired for appearance or to facilitate cleaning of the cable for resterilization. In addition to the treaded connections between the locking nut and light source cap which have been shown, it also is contemplated that other types of fittings may be suitable for compressing the compression seal ring to form the desired seal, such as bayonette fittings, snap fittings, etc.

The disclosure in its broader aspects therefore is not limited to the specific embodiments herein shown and described but departures may be made therefrom within the scope of the accompanying claims without departing from the scope of the claims and without sacrificing the advantages of the device disclosed.

What is claimed is:

1. A liquid light guide comprising:

a flexible elongated tubular member having opposed first and second open end portions;

first and second light transmissive plug members, the first plug member inserted at least partially into the first end portion of the tubular member and the second plug member inserted at least partially into the second end portion of the tubular member;

a liquid light transmissive medium disposed within the tubular member; and a sealing assembly for forming a substantially fluid tight seal adjacent at least one of the first and second end portions of the tubular member, the sealing assembly including:

a compressible sealing ring configured and dimensioned to be positioned around the at least one end portion of the tubular member;

a first compression member configured and dimensioned to be at least partially positioned around the at least one end portion; and a second compression member configured and dimensioned to engage the first compression member;

wherein the first and second compression members define a compression cavity to accommodate the sealing ring and are engagable for relative longitudinal movement between a compression position and a disengaged position such that, in the compression position, the compressible sealing ring is compressed in the compression cavity into sealing engagement with the at least one end portion of the tubular member to form a substantially fluid tight seal between the respective light transmissive plug member and the at least one end portion.

2. The light guide according to claim 1 wherein at least one of the first and second compression members is configured to exert a uniform radial inward force about the periphery of the sealing ring.

3. The light guide according to claim 1 wherein the first and second compression members each include respective threaded segments such that the first and second compression members are threadably engagable for relative movement between the compression position and the disengaged position.

4. The light guide according to claim 1 wherein the sealing ring includes opposed first and second chamfered surface portions disposed on an outer surface thereof and wherein the compression members each include chamfered surfaces on internal surfaces thereof and wherein upon engaging the compression members, the internal chamfered surface portions thereof engage the opposed first and second chamfered surface portions of the sealing ring to compress the sealing ring and displace at least portions of the sealing ring radially inwardly such that the at least one end portion of the elongated tubular member engages the respective light transmissive member in a substantially fluid tight manner.

5. The light guide according to claim 1 including a metal outer sheath positioned about at least a portion of the elongated tube.

6. The light guide according to claim 5 wherein one of the compression members is securely attached to an end portion of the outer sheath.

7. The light guide according to claim 1 wherein the elongated tube comprises a fluorinated ethylene polymer.

8. The light guide according to claim 1 wherein the light transmissive medium comprises a heavy mineral oil having a specific gravity equal to or greater than about 0.84.

9. The light guide according to claim 1 wherein the second compression member includes a connector portion configured to connect to one of an external light source, a light source adapter, an endoscope and an endoscope adapter.

10. The light guide according to claim 1 wherein the seal ring comprises neoprene.

11. A method for forming a liquid light guide of the type including a flexible tube member having opposed tube end portions, the tube being filled with a light transmissive fluid, including the steps of:

positioning a transparent light transmissive plug at least partially within at least one of the tube end portions; and compressing a sealing member around at least a portion of the at least one tube end portion between at least two compression members to enhance the sealing engagement between the transmissive plug and the at least one tube end portion.

12. The method of claim 11 wherein the step of compressing a seal member comprises compressing a sealing ring.

13. A method for forming a liquid light guide of the type including a flexible tube member having opposed tubs end portions, the tube being filled with a light transmissive fluid, including the steps of:

positioning a transparent light transmissive plug at least partially within at least one of the tube end portions; and compressing a sealing member having a substantially trapezoidal cross-sectional portion between two fittings to create a radially inward force upon the at least one tube end portion to enhance the sealing engagement between the transmissive plug and the at least one tube end portion.

14. The method of claim 11 including the step of positioning first and second compression members with respect to the at least one tube end portion to define a compression cavity to accommodate the sealing member and wherein the step of compressing includes compressing the sealing member within the compression cavity such that the sealing member exerts a substantially radially inward force on the at least one tube end portion.

15. The method of claim 14 wherein the step of compressing includes the step of moving at least one of the first and second compression members towards the other to compress the sealing member.

16. The method of claim 15 wherein the first and second compression members include inner chamfered surfaces whereby during the step of moving the inner chamfered surfaces engage corresponding outer chamfered surfaces of the sealing member to compress the sealing member in an at least radial inward direction.

17. The method of claim 11 further including the step of positioning an outer sheath about at least a portion of the tube member.

18. A method for forming a liquid light guide of the type including a flexible tube member having opposed tube end portions, the tube being filled with a light transmissive fluid, including the steps of:

inserting a transparent light transmissive plug at least partially within at least one of the tube end portions;

positioning a sealing member around the one tube end portion; and compressing the sealing member with a compression member mounted about the one tube end portion, whereby the sealing member exerts a radial force onto the one tube end portion to enhance the sealing engagement between the transmissive plug and the one tube end portion.

19. The method of claim 18 wherein the step of compressing includes the step of moving the compression member with respect to the sealing member such that an inner surface of the compression member engages a corresponding outer surface of the sealing member to exert at least a radially inward force on the sealing member to compress the sealing member.

20. The method of claim 19 wherein first and second compression members are mounted with respect to the one tube end portion and wherein the step of moving includes moving at least the first compression member with respect to the sealing member such that inner surfaces of the first and second compression members engage corresponding outer surfaces of the sealing member to compress the sealing member in an at least radial inward direction.

* * * * *